United States Patent
Moreau et al.

(10) Patent No.: US 10,237,617 B2
(45) Date of Patent: *Mar. 19, 2019

(54) SYSTEM AND METHOD FOR BLENDING LINEAR CONTENT, NON-LINEAR CONTENT OR MANAGED CONTENT

(71) Applicant: Comcast Cable Communications Management, LLC, Philadelphia, PA (US)

(72) Inventors: Samuel Moreau, Bellevue, WA (US); Donald Ahrens, San Francisco, CA (US); Georgia Gibbs, Fairfax, CA (US); John Carney, Corte Madera, CA (US); David de Andrade, San Anselmo, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,386

(22) Filed: Jun. 30, 2017

(65) Prior Publication Data

US 2018/0146247 A1    May 24, 2018

Related U.S. Application Data

(63) Continuation of application No. 15/137,099, filed on Apr. 25, 2016, now Pat. No. 9,729,924, which is a (Continued)

(51) Int. Cl.
*H04N 21/443* (2011.01)
*G06F 3/0482* (2013.01)
(Continued)

(52) U.S. Cl.
CPC ....... *H04N 21/4438* (2013.01); *G06F 3/0482* (2013.01); *H04N 5/44543* (2013.01);
(Continued)

(58) Field of Classification Search
CPC ........... H04N 21/4438; H04N 5/44543; H04N 5/44591; H04N 21/4312; H04N 21/472;
(Continued)

(56) References Cited

U.S. PATENT DOCUMENTS

| 5,287,489 A | 2/1994 | Nimmo et al. |
| 5,321,750 A | 6/1994 | Nadan |

(Continued)

FOREIGN PATENT DOCUMENTS

| EP | 0624039 A2 | 11/1994 |
| EP | 0963115 A1 | 12/1999 |

(Continued)

OTHER PUBLICATIONS

Fernando Pereira, "The MPEG-4 Book", Prentice Hall, Jul. 10, 2002.

(Continued)

*Primary Examiner* — Hunter B Lonsberry
(74) *Attorney, Agent, or Firm* — Banner & Witcoff, Ltd.

(57) ABSTRACT

A user interface allows for blending of television program choices from which a viewer may select, the blending representing options for linear and non-linear programming presented together within a single hierarchy of a designated category. The blending may further include managed content relevant to the designated category, where desired. Such designated categories may include television programming categories and/or content categories. The options for linear and non-linear programming may be presented together within a single screen of the user interface.

20 Claims, 9 Drawing Sheets

Related U.S. Application Data continuation of application No. 14/661,488, filed on Mar. 18, 2015, now Pat. No. 9,363,560, which is a continuation of application No. 13/860,146, filed on Apr. 10, 2013, now Pat. No. 9,021,528, which is a continuation of application No. 13/049,948, filed on Mar. 17, 2011, now Pat. No. 8,448,208, which is a continuation of application No. 12/730,771, filed on Mar. 24, 2010, now Pat. No. 7,958,528, which is a continuation of application No. 10/664,275, filed on Sep. 16, 2003, now Pat. No. 7,703,116, which is a continuation-in-part of application No. 10/460,950, filed on Jun. 12, 2003, now Pat. No. 8,707,354, which is a continuation-in-part of application No. 10/390,064, filed on Mar. 14, 2003, now Pat. No. 8,042,132.

(60) Provisional application No. 60/486,567, filed on Jul. 11, 2003.

(51) Int. Cl.
*H04N 5/445* (2011.01)
*H04N 21/472* (2011.01)
*H04N 21/478* (2011.01)
*H04N 21/482* (2011.01)
*H04N 21/854* (2011.01)
*H04N 21/431* (2011.01)
*H04N 21/8545* (2011.01)
*H04N 5/45* (2011.01)

(52) U.S. Cl.
CPC ..... *H04N 5/44591* (2013.01); *H04N 21/4312* (2013.01); *H04N 21/472* (2013.01); *H04N 21/478* (2013.01); *H04N 21/47202* (2013.01); *H04N 21/482* (2013.01); *H04N 21/4821* (2013.01); *H04N 21/854* (2013.01); *H04N 21/8545* (2013.01); *H04N 5/45* (2013.01)

(58) Field of Classification Search
CPC .......... H04N 21/47202; H04N 21/478; H04N 21/482; H04N 21/4821; H04N 21/854; H04N 21/8545; G06F 3/0482
See application file for complete search history.

(56) References Cited

U.S. PATENT DOCUMENTS

| | | |
|---|---|---|
| 5,353,121 A | 10/1994 | Young et al. |
| 5,485,221 A | 1/1996 | Banker et al. |
| 5,521,841 A | 5/1996 | Arman et al. |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,737,552 A | 4/1998 | Lavallee et al. |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,038,560 A | 3/2000 | Wical |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,698,020 B1 | 2/2004 | Zigmond et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,910,191 B2 | 6/2005 | Segerberg et al. |
| 6,918,131 B1 | 7/2005 | Rautila et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |
| 7,197,715 B1 | 3/2007 | Valeria |

(56) References Cited

U.S. PATENT DOCUMENTS

| | | |
|---|---|---|
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 * | 4/2010 | Moreau ............ G06F 3/0482 725/44 |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 * | 6/2011 | Moreau ............ G06F 3/0482 725/44 |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,448,208 B2 * | 5/2013 | Moreau ............ G06F 3/0482 725/44 |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 * | 4/2015 | Moreau ............ G06F 3/0482 725/44 |
| 9,363,560 B2 * | 6/2016 | Moreau ............ G06F 3/0482 |
| 9,516,253 B2 | 12/2016 | De Andrade et al. |
| 9,729,924 B2 * | 8/2017 | Moreau ............ G06F 3/0482 |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |
| 2004/0019908 A1 | 1/2004 | Williams et al. |
| 2004/0022271 A1 | 2/2004 | Fichet et al. |
| 2004/0024753 A1 | 2/2004 | Chane et al. |

(56) References Cited

U.S. PATENT DOCUMENTS

| | | |
|---|---|---|
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0105793 A1 | 5/2006 | Gutowski et al. |
| 2006/0125962 A1 | 6/2006 | Shelton et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0050343 A1 | 3/2007 | Siddarampappa et al. |
| 2007/0064715 A1 | 3/2007 | Lloyd et al. |
| 2007/0112761 A1 | 5/2007 | Xu et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0288641 A1 | 11/2008 | Messer et al. |
| 2008/0288644 A1 | 11/2008 | Gilfix et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2012/0002111 A1 | 1/2012 | Sandoval et al. |
| 2012/0054811 A1 | 3/2012 | Spears |
| 2012/0117151 A1 | 5/2012 | Bill |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0347018 A1 | 12/2013 | Limp et al. |

(56) References Cited

U.S. PATENT DOCUMENTS

| | | |
|---|---|---|
| 2013/0347030 A1 | 12/2013 | Oh et al. |
| 2014/0006951 A1 | 1/2014 | Hunter |
| 2014/0009680 A1 | 1/2014 | Moon et al. |
| 2014/0032473 A1 | 1/2014 | Enoki et al. |
| 2014/0068648 A1 | 3/2014 | Green et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0359662 A1 | 12/2014 | Packard et al. |
| 2014/0365302 A1 | 12/2014 | Walker |
| 2014/0373032 A1 | 12/2014 | Merry et al. |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 1058999 A1 | 12/2000 |
| EP | 1080582 A1 | 3/2001 |
| GB | 2323489 A | 9/1998 |
| GB | 2448874 A | 11/2008 |
| GB | 2448875 A | 11/2008 |
| WO | 9963757 A1 | 12/1999 |
| WO | 0011869 A1 | 3/2000 |
| WO | 0033576 A1 | 6/2000 |
| WO | 0110115 A1 | 2/2001 |
| WO | 0182613 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

Michael Adams, "Open Cable Architecture", Cisco Press, Dec. 3, 1999.
Andreas Kraft and Klaus Hofrichter, "An Approach for Script-Based Broadcast Application Production", Springer-Verlag Berlin Heidelberg, pp. 74-82, 1999.
Mark Riehl, "XML and Perl", Sams, Oct. 16, 2002.
MetaTV, Inc., PCT/US02/29917 filed Sep. 19, 2002, International Search Report dated Apr. 14, 2003; ISA/US; 6 pages.
Sylvain Devillers, "Bitstream Syntax Definition Language: an Input to MPEG-21 Content Representation", Mar. 2001, ISO, ISO/IEC JTC1/SC29/WG11 MPEG01/M7053.
Shim, et al., "A SMIL Based Graphical Interface for Interactive TV", Internet Tech. Laboratory Dept. of Comp. Engineering, San Jose State University, pp. 257-266, 2003.
Yoon, et al., "Video Gadget: MPET-7 Based Audio-Visual Content Indexing and Browsing Engine", LG Electronics Institute of Technology, 2001, pp. 59-68.
Watchwith webpage; http://www.watchwith.com/content_owners/watchwith_plaiform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).
European Patent Application No. 09175979.5—Office Action dated Dec. 13, 2011.
Canadian Patent Application No. 2,685,833—Office Actoin dated Jan. 20, 2012.
Li, Y. et al. "Reliable Video Clock Time Recognition", Pattern Recognition, 2006, 1CPR 1006, 18th International Conference on Pattern Recognition, 4 pages.
European Search Report dated Mar. 1, 2010.
Salton et al., Computer Evaluation of Indexing and Text Processing Journal of the Association for Computing Machinery, vol. 15, No. 1, Jan. 1968, pp. 8-36.
Smith, J.R. et al., An Image and Video Search Engine for the World-Wide Web Storage and Retrieval for Image and Video Databases 5, San Jose, Feb. 13-14, 1997, Proceedings of Spie, Belingham, Spie, US, vol. 3022, Feb. 13, 1997, pp. 84-95.
Kontothoanassis, Ledonias et al. "Design, Implementation, and Analysis of a Multimedia Indexing and Delivery Server", Technical Report Series, Aug. 1999, Cambridge Research Laboratory.
Messer, Alan et al., "SeeNSearch: A context Directed Search Facilitator for Home Entertainment Devices", Paper, Samsung Information Systems America Inc., San Jose, CA, 2008.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 506-621, May 2004.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffan Staab et al., "Semantic Multimedia", Reasoning Web; Lecture Notes in Computer Science, pp. 125-170, Sep. 2008.
European Search Report for Application No. 09180776.8, dated Jun. 7, 2010, 9 pages.
European Search Report, EP 09 18 0762, completion date Mar. 22, 2010.
European Search Report dated Jun. 4, 2010.
EP Application No. 09 179 987.4-1241—Office Action dated Feb. 15, 2011.
European Application No. 09 175 979.5—Office Action dated Apr. 11, 2011.
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Canadian Office Action—CA 2,685,833—dated Jan. 22, 2015.
European Extended Search Report—EP 13192112.4—dated May 11, 2015.
CA Response to Office Action—CA Appl. 2,685,833—dated Jul. 17, 2015.
Response to European Office Action—European Appl. 13192112.4—dated Dec. 9, 2015.
CA Office Action—CA App 2,685,833—dated Jan. 27, 2016.
European Office Action—EP App 14159227.9—dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Oct. 2013.
CA Office Action—CA Application 2685833—dated Feb. 8, 2017.
Nov. 29, 2017—Canadian Office Action—CA 2,685,833.
Jul. 31, 2018—European Decision to Refuse—14159227.9.
Mar. 9, 2018—European Office Action—EP 13192112.4.

(56) References Cited

OTHER PUBLICATIONS

Feb. 19, 2018—European Summons to Oral Proceedings—EP 14159227.9.

* cited by examiner

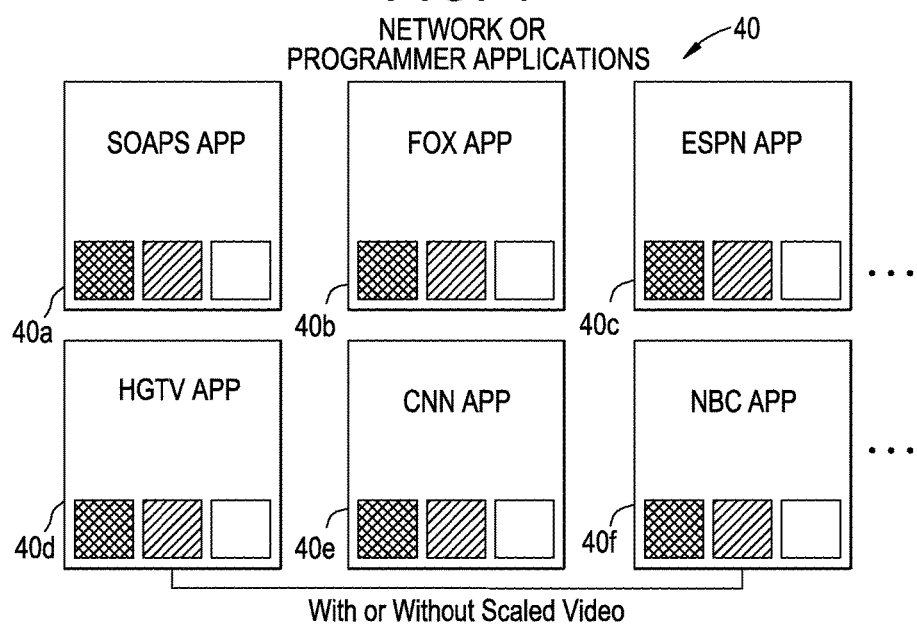
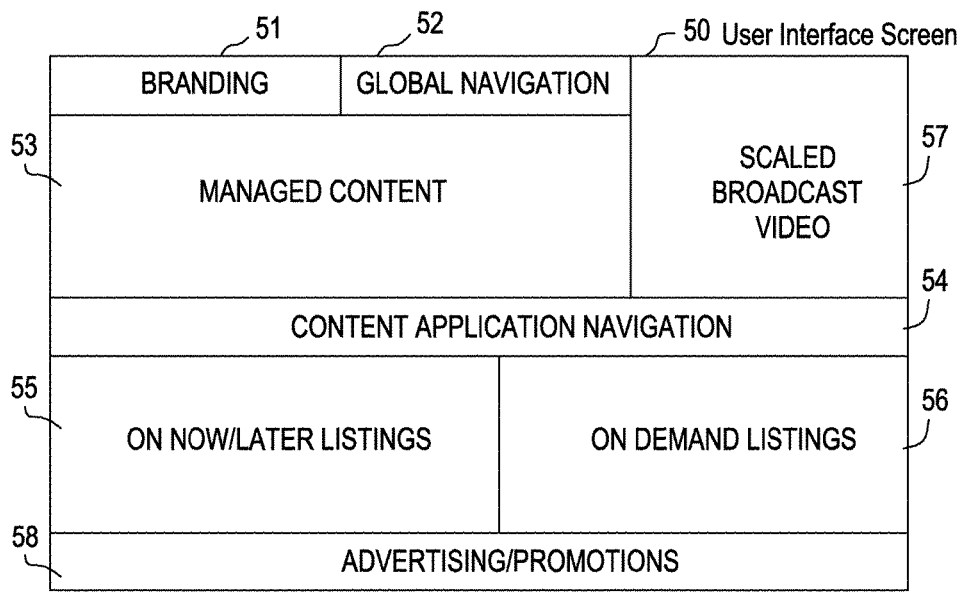

SYSTEM AND METHOD FOR BLENDING LINEAR CONTENT, NON-LINEAR CONTENT OR MANAGED CONTENT

RELATED APPLICATIONS

The present application is a continuation of and claims priority to co-pending U.S. application Ser. No. 15/137,099, filed Apr. 25, 2016, which is a continuation of and claims priority to U.S. application Ser. No. 14/661,448, filed Mar. 18, 2015 (now U.S. Pat. No. 9,363,560), entitled "System and Method for Construction, Delivery and Display of iTV Applications that Blend Programming Information of On-Demand and Broadcast Service Offerings,", which is a continuation of U.S. application Ser. No. 13/860,146, filed Apr. 10, 2013 (now U.S. Pat. No. 9,021,528), entitled "System and Method for Construction, Delivery and Display of iTV Applications that Blend Programming Information of On-Demand and Broadcast Service Offerings," which is a continuation of and claims priority to U.S. application Ser. No. 13/049,948, filed Mar. 17, 2011 (now U.S. Pat. No. 8,448,208), entitled "System and Method for Construction, Delivery and Display of iTV Applications that Blend Programming Information of On-Demand and Broadcast Service Offerings," which is a continuation of and claims priority to U.S. application Ser. No. 12/730,771, filed Mar. 24, 2010 (now U.S. Pat. No. 7,958,528), which is a continuation of and claims priority to U.S. application Ser. No. 10/664,275 (now U.S. Pat. No. 7,703,116), entitled "System and Method for Construction, Delivery and Display of iTV Applications that Blend Programming Information of On-Demand and Broadcast Service Offerings," filed Sep. 16, 2003, which:

a) is a non-provisional of U.S. provisional application No. 60/486,567, entitled "System and Method for Construction, Delivery and Display of iTV Applications that Blend Programming Information of On-Demand and Broadcast Service Offerings," filed Jul. 11, 2003;

b) is a continuation-in part of and claims priority to U.S. application Ser. No. 10/390,064, filed Mar. 14, 2003 (now U.S. Pat. No. 8,042,132), entitled "System and Method For Construction, Delivery and Display of iTV"; and c) is a continuation-in-part of and claims priority to U.S. application Ser. No. 10/460,950, filed Jun. 12, 2003, entitled "Graphically Rich, Modular, Promotional Tile Interface for Interactive Television."

FIELD

The present application relates to systems and methods for enabling and automating the delivery of interactive television content to subscribers.

BACKGROUND

Interactive television (iTV) is currently available in varying forms, each of which combines, in some form or other, the passive viewing experience of traditional TV viewing with the interactive nature of the World Wide Web. Thus, in different implementations, iTV might allow viewers (or subscribers) to review local news headlines or weather forecasts while watching their favorite television shows and/or electronically chatting with other viewers about the latest plot twists. Such text and graphics information is referred to as Managed Content. Certainly all iTV systems have a version of an interactive program guide or electronic program guide (IPG or EPG, respectively) that allows subscribers to learn about and select desired programming.

Such programming generally comes in two forms: linear and non-linear. Linear programming is another name for traditional broadcast programming That is, programming that is available for viewing by subscribers according to a schedule promulgated by the iTV service and/or content provider. Current IPGs allow subscribers to browse and select linear programming and some also include the ability to subset linear program listing data by subject or type of programming.

In addition to linear or broadcast television, subscribers may now also be given opportunities to select from a list of programs that are not linear, but instead are provided on-demand Such content is generically referred to as non-linear programming or Video on Demand (VOD). Current IPGs for browsing and selecting VOD programs include the ability to select such programming from categories of non-linear (on-demand) programming.

SUMMARY

The present application provides, in various embodiments, systems and methods by which subscribers are presented with navigational interfaces that blend linear, non-linear, and (in some cases) managed content or information services and/or links to games together in a single screen, or single iTV application.

In one embodiment, the user interface allows for blending of television program choices from which a viewer may select, the blending representing options for linear and non-linear programming presented together within a single hierarchy of a designated category. The blending may further include managed content relevant to the designated category, where desired. Such designated category may be a television programming category and/or a content category. The options for linear and non-linear programming are, in some embodiments, presented together within a single screen of the user interface.

A further embodiment provides a user interface that includes a navigational hierarchy that blends linear and non-linear programming options, and information services in a single presentation. The blend of programming choices may be presented as a set of all available programming options and/or a subset of all available programming options. The navigational hierarchy is, in some cases, presented in a single screen of information and the blending of information services with linear and non-linear programming information may be done at multiple levels of content categorization. The non-linear programming information may include information about programs recorded on a subscriber storage unit. The blending referred to above may be performed according to categories (e.g., content categories, content provider categories, etc.) of programming, and/or may span content delivery types and content categories.

Still another embodiment provides a user interface which includes a single screen having various regions thereof for displaying non-linear programming information, linear programming information and managed content relevant to the linear and non-linear programming information or category. The linear and non-linear programming information are preferably within a common category (e.g., a content category or a content provider category).

The user interface may additionally include a scaled audio/video or background audio/video presentation area. A navigation control configured to allow scrolling through content offerings (e.g., channel families) provided by a common content provider may also be provided. In such cases, video information presented in the scaled or background video presentation area can be dependent upon scrolling via the navigation control. The navigation control may include a category descriptor.

BRIEF DESCRIPTION OF THE DRAWINGS

The present invention is illustrated by way of example, and not limitation, in the figures of the accompanying drawings, in which:

FIG. 4 illustrates the separation of content types among channel applications within an iTV navigation application hierarchy configured in accordance with an embodiment of the present invention.

FIG. 5 illustrates an example of a user interface layout configured for the presentation of multiple content types in accordance with an embodiment of the present invention.

DETAILED DESCRIPTION

Figure 1:
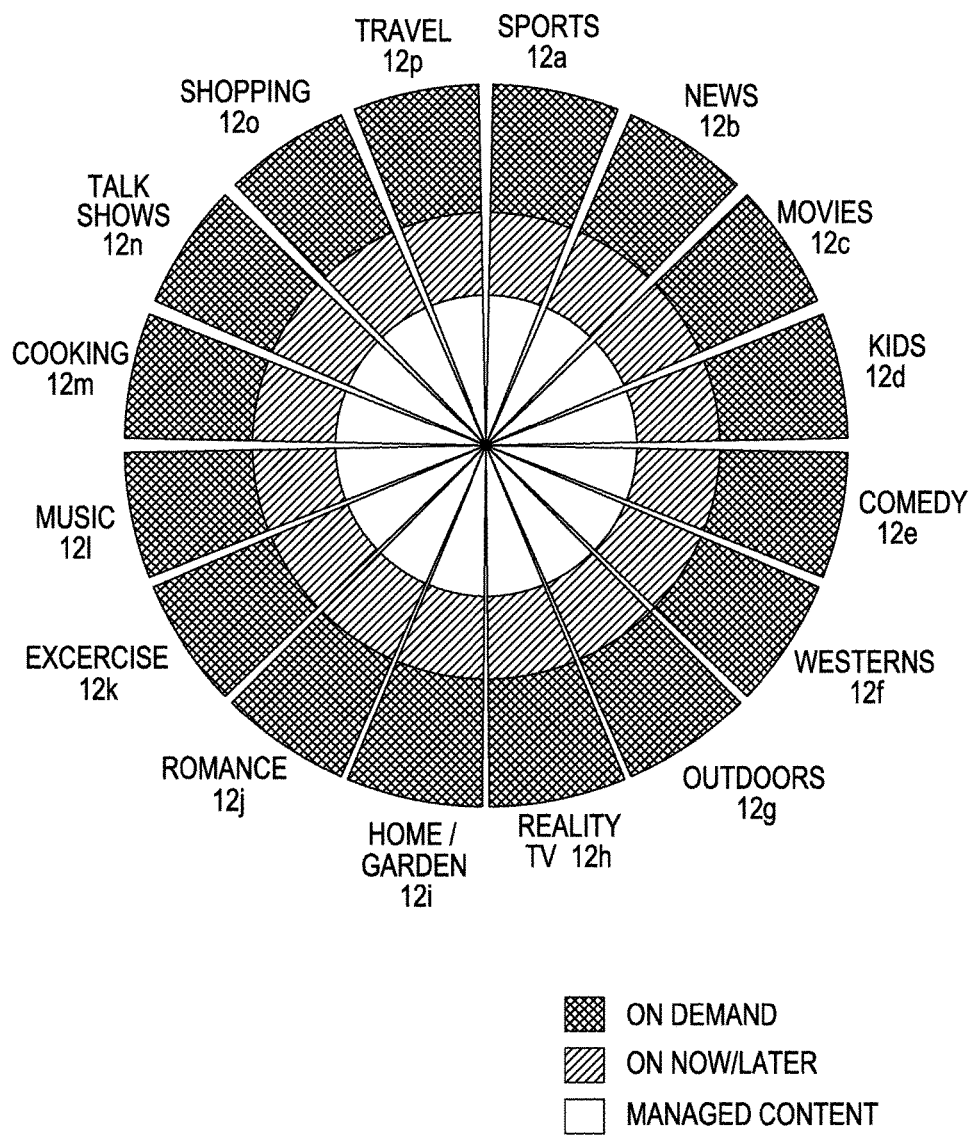
FIG. 1 illustrates a conceptual model for the blending of linear programming, non-linear programming and managed content in a single user interface or iTV application in accordance with an embodiment of the present invention.

Described herein are systems and methods by which subscribers are presented with iTV navigational hierarchies that blend linear, non-linear, and (optionally) information services into single, simple presentations. Where current IPG and similar systems fail is in the lack of seamless blending of linear and non-linear programming options. That is, in current IPG systems linear and non-linear programming are presented as separate hierarchies of navigable content. In contrast, the present invention provides systems and methods to allow a subscriber to view both linear and non-linear programming choices together in a single screen, or single iTV application. The present invention thereby allows subscribers to view programming alternatives across both linear and non-linear opportunities.

In some cases, this blend of programming choices may be presented as the entire set of available programming options or, in other cases, as a subset (or division) of all the available choices. These subsets of programming choices may follow similar hierarchical divisions as exist in current IPG systems; however, in the context of the present invention these divisions will span linear and non-linear programming rather than living in separate hierarchies. Each of the category divisions which can be implemented in accordance with the present invention can be further subdivided in to subcategories, which can then be divided again and again as need be.

To illustrate, consider an example of such category division. This example is presented solely for illustrative purposes and should not in any way be read as limiting the types of categorization that can be created or accommodated in the present methods and systems. In accordance with the present invention, a major content category such as "Sports" may be divided in to various subcategories such as "football", "baseball", "soccer", etc. The subcategories such as "football" may then be divided in to further subcategories, such as "professional" (or "pro") and "college" (or "amateur"). Even these subcategories such as "pro" may themselves be further divided in to additional subcategories such as "NFL" and "Arena Football", and so on. This illustration shows that categorization can be continued to any desired level so as to effectively divide up all of the available content offerings into different groupings. Within any and all of these hierarchical divisions, the present invention allows for the aggregated display of linear programming information, non-linear programming information, and even managed content services all relative to the particular division categorization.

The benefit of this approach to the television subscriber is that he/she can choose a programming category and then be provided with listings of all available programming in that category. This is distinct from prior IPG solutions in which a subscriber must first decide if he/she wants to view linear programming or non-linear programming and then must choose a content category for browsing (or view a complete list of all programming options within that linear or non-linear class). In such prior systems, a subscriber has to potentially navigate two hierarchies (which may have different structures) to discover what programming is available in either liner or non-linear form.

Another unique attribute of the present methods and systems is that within the categorized blending of linear and non-linear programming the present invention also allows for the blending of information services (also called managed content) relevant to that categorization. Continuing the "Sports" example then, in addition to presenting all available linear and non-linear sports programming, a user interface configured in accordance with the present invention may also provide information services (e.g., text, graphics, advertisements, promotions) relevant to the sports category within the single screen or application. This blending of information services with linear and non-linear programming information can exist at any level of categorization and so one may have, for example, a blended information service for baseball, or football, etc., in various embodiments of the present invention.

In some cases the blended category applications may also include listing information about programs that the subscriber has recorded on a hard disk or other storage unit (e.g., a personal video recorder, video cassette recorder, etc.). In the "sports" example above, the application may therefore also include listings of any sports-related content that the subscriber had previously recorded.

For the purpose of the description presented below, we will refer to non-linear programming as "On Demand" content. That is, audio/video content that does not adhere to previously scheduled program times/dates, and may optionally allow for user controls such as fast-forward, pause and rewind. This includes content/programming played from a VOD server or a local hard disk (or other storage unit), or any other content (including IP-based content delivery) generally available to start on-demand by the subscriber.

We will further refer to linear programming as "On Now" (or in some instances the broadcast listings references are divided in to "On Now" and "On Later"—where "On Now" are all of the linear broadcast shows that have already started, or will start within some small interval of time, and the "On Later" linear broadcast shows are those that have not yet started, or that will not start for some short interval of time) content—traditional broadcast television content. Delivery of "on now" content is based on predetermined programming schedules of date and time (usually promulgated by the iTV service provider or, most often, by the content provider). This category includes time-based data for both what is on right now (i.e., programming that is currently being broadcast over the iTV service) and content secluded to be broadcast at a specific future point in time.

Finally, we will refer to information services as "Managed Content". This category includes services made up of elements such as text; graphics and/or audio/video information combined to deliver supplemental information services (e.g., weather forecasts, sports scores, etc.). Managed content also includes advertisements and promotions and may also contain links to On Now and/or On Demand content or even games and other applications.

Along with the various content types comes categorization that is logical to the content. With On Demand and On Now content, this categorization can take many forms. The present inventors have found instances of these types of content sorted into as few as 14 categories up to as many as 42 categories. Table 1 illustrates a potential categorization across the three content types.

TABLE 1

Examples of Content Categories within Content Types

| ON DEMAND | ON NOW/LATER | MANAGED CONTENT |
|---|---|---|
| News | News | News |
| Movies | Movies | Movies |
| Kids | Kids | Kids |
| Sports | Sports | Sports |
| Comedy | Comedy | Weather |
| Westerns | Westerns | Local |
| Outdoors | Outdoors | Entertainment |
| Reality TV | Reality TV | Shopping |
| Home/Garden | Home/Garden | Travel |
| Romance | Romance | |
| Exercise | Exercise | |
| Music | Music | |
| Cooking | Cooking | |
| Talk Shows | Talk Shows | |
| Shopping | Shopping | |
| Travel | Travel | |
| Etc. | Etc. | |

Table 1 is illustrative of the problem with prior art. Namely, there are independent hierarchies for finding programming and a user interface implementing these hierarchies would not serve the viewer that wants to see all a list of SPORTS content regardless of its type (linear programming, non-linear programming, and managed content) at one time. An example of the present sorting methodology, however, would first expose content categories to the user and then only later (e.g., the next layer down or subcategory) expose the content type (e.g., On Demand, On Now, and/or Managed Content). FIG. 1 illustrates this concept.

FIG. 1 illustrates a conceptual model for the blending of linear programming, non-linear programming and managed content in a single user interface or iTV application in accordance with an embodiment of the present invention. The model 10 is meant to illustrate the universe (or a portion thereof) of television content offerings within an iTV service. This universe of content has been divided into content categories (News, Sports, Movies, etc.) 12a-12p and each content category may have content elements that are within on-demand, on now or managed content subcategories. For example, the Movies category 12c may include on-demand movies, regular broadcast movies (on now/later) and managed content such as movie synopses, run times, and so on. Rather than segregating the available information regarding movies across disparate hierarchies, the present invention combines this information into a single hierarchy within the categorized element. This approach allows for the blending of services such that the user can go to one place to view the programming selections and managed content for a given category. One advantage to this approach is, for example, that all SPORTS or MOVIE content is available in a single view.

The combination of delivery types and categories can be expressed in a user interface that is very straightforward. In one embodiment, the iTV application top level of the user interface need only present the most general (On Demand, On Now) and most popular categories (Movies, Sports, News, Kids, Games, etc). The rest of the content categories may be exposed through a search mechanism, which is ubiquitous throughout the user interface. Thus, even very specific categories are quickly accessible because the search mechanism is exposed on almost all screens of the user interface—always presenting programming that has been sorted by the type of filter the viewer has chosen—whether it is a delivery type or main category. To better illustrate this concept, we describe below various embodiments of a user interface and discuss how the user interacts therewith (e.g., via a remote control) to navigate the various paths to the desired content.

Figure 2:
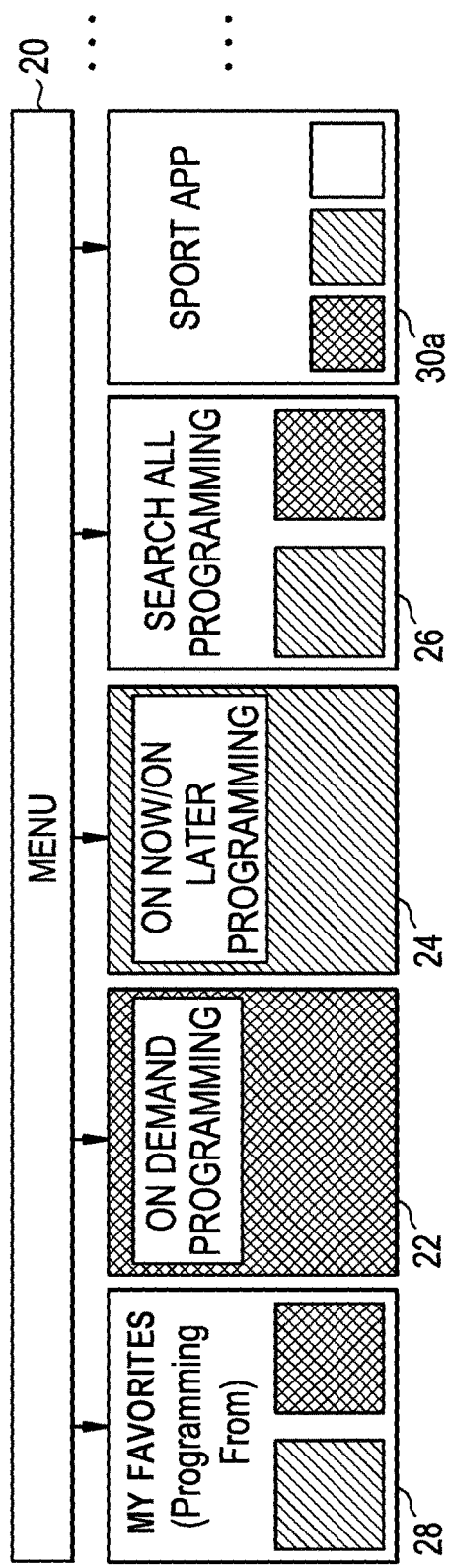
FIG. 2 illustrates an example of an iTV navigation application hierarchy configured in accordance with an embodiment of the present invention.

As shown in FIG. 2, at the very highest level of one embodiment of the user interface architecture is a MENU application 20. The MENU's role is to provide persistent navigation for global user interface functions (e.g., Help, Home, Search, and Favorites) as well as primary destinations (e.g., On Demand and On Now programming) A secondary function of the MENU 20 is to allow for controlled promotions to any content across all applications. An important point in the process is to begin to slice the content types based on various user types and user scenarios.

FIG. 2 illustrates the first step in this process by showing the content types, On Demand and On Now, as stand-alone destinations 22 and 24, respectively. In addition, a SEARCH application 26 would allow the user to make a specific query and get results from content that is both On Demand and On Now (as represented by the content-type boxes within the Search application). In addition, a predefined (or perhaps user-specified up to a point) number of category-specific applications focused around strategic content categories (e.g. Movies, Sports, News, Kids, Games, etc.) and that blend the content types within a category, may be presented via or through the MENU 20. FAVORITES 28 is also an application that includes a cross-section of On Demand and On Now/Later content, but is populated based on the user's preferences as a filter. Note that the architecture illustrated in FIG. 2 does not exclude Managed Content services from being an element of "My Favorites" or of "Search". However, a preferred embodiment of the present invention will have the Managed Content mixed in within category applications such that it is presented within the context of linear and non-linear programming information aggregation.

It will be apparent to the reader that one could easily devise many possible content categories; indeed, many more than could be comfortably fit into an elegant user interface to be presented on a television screen. However, the creation of major, category-specific applications focused around strategic content categories (i.e., Sports, News, Shopping, Kids, etc.) would allow a logical blending of the various content types.

Figure 3:
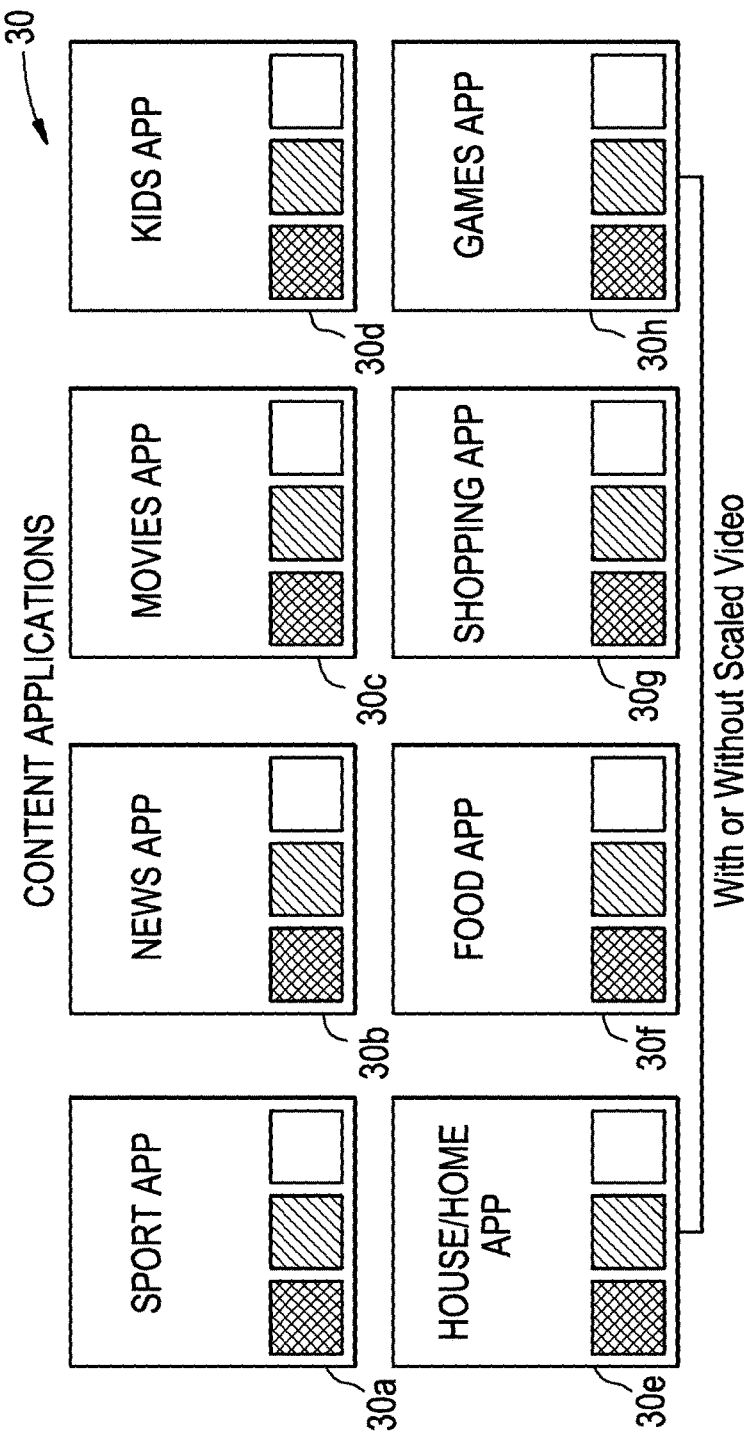
FIG. 3 illustrates the separation of content types among category applications within an iTV navigation application hierarchy configured in accordance with an embodiment of the present invention.

FIG. 3 illustrates an example that includes eight major content categories 30a-30h, with the blending of content from On Demand (left-most blocks within the categories), On Now (middle) and Managed Content (right-most) sources. The premise here is that the iTV service has "collected" all the data (available programming and information services) around a category (such as SPORTS) and is providing that data to the user in a single experience. A predefined (or perhaps user-specified up to a point) number of these content applications (apps) may be presented via or through the MENU 20. The present invention also provides a form of user-selected personalization where the user is allowed to select which blended content app(s) he/she would like in his/her MENU 20. In one embodiment, this personalization of the MENU 20 to show specific blended categories is done through a settings screen that allows for selection and sequencing of categories to be added to the menu.

FIG. 4 illustrates another example of the use of blended programming within categories in accordance with the present invention. This time the categorization does not involve solely content categories, but rather network (or content provider) categories 40a-40f. Network programmer (or content provider) owned pages (e.g., ESPN™, etc.) and secondary content categories (e.g., SOAPS) thus also allow for the blending of content types. In this experience, the user is shown content listings (from the various content providers) for On Demand and On Now programming for that network programmer, mixed in with the network programmer's Managed Content (such as scores or sports news). Thus, in these applications, the On Demand, On Now and managed content types provided or related to the network programmer are blended together into the application navigation scheme. The network or programmer application may also be expanded to include all content that is related by network family (e.g. a Disney network of channels including Disney channel, ABC, ESPN, ESPN2, etc.) or programmer brand (e.g. Scripps™ networks, HBO™, Showtime™, etc.) The SOAPS application 40a is used as an example of a service operator (e.g., MSO, Telco, etc.) owned application and is meant to illustrate that secondary category applications can be created in addition to the major category applications. As illustrated in FIGS. 3 and 4, some applications could have scaled video in the interface while others may utilize full screen, or screen overlay video.

In one embodiment of the present invention, navigation to a programmer-specific blended content application is done from a Channel Info Bar portion of the user interface as well as via the network-specific listings in the On Demand, On Now, and Favorites interface areas. The user may also access blended content applications (or any service) from the remote control if such applications or services are assigned a channel number.

As indicated above, the present invention may be implemented by creating and populating interfaces that uniquely combine linear and non-linear programming information. In some cases these interfaces also combine Managed Content services such as text, graphics, advertisement, and promotions relevant to a categorization of programming with the programming information. The problems associated with delivering these blended content services lies in the aggregation of the data elements, the construction of the individual applications, the distribution of the applications and the data elements, and the interface elements that provide for navigation by the user. Below we present various illustrations of interface implementations, however, it should be remembered that these examples are not meant to be an exhaustive catalog of the manners in which the blending of content in accordance with the present invention may be carried out. Many other implementations are likewise possible and so the examples presented below should be regarded as illustrative, but not limiting in terms of the scope of the present invention.

The aggregation of the data elements in accordance with the present invention includes the aggregation of linear programming data, non-linear programming data, and managed content data about a single category. In the following examples the linear and non-linear programming data is combined with the managed content data at a server and then broadcast to one or more subscribers as part of individual iTV applications that represent the category blended content applications. Other implementations include accessing some or all of the data from a data store on the set-top box (STB). The above-cited co-pending patent applications provide examples of content distribution schemes which may be used to create and distribute these iTV applications and so a description of such systems and methods will not be repeated herein. The transport of the individual applications and their data sets may then be carried out using conventional data carouselling technology or by accessing information and applications cached on the STB. In other embodiments some of the data may be retrieved by the client application by using programming interfaces provided on a set-top box which allows access to linear and/or non-linear programming, and/or managed content information. Such local access would allow for retrieving information by category.

FIG. 5 illustrates an example wire format of a user interface screen 50 that incorporates the above-described blending of different content elements: linear programming, non-linear programming, and managed content services. The positioning of various elements in the diagram is not indicative of a specific design but rather of relative screen real estate allocation for the various graphical elements. Of course, different embodiments of the user interface may allocate screen real estate differently, for example in order to emphasize currently selected elements of the interface or to accommodate viewer preferences.

In order to provide the blended content elements, all elements need not be visible at one time. For example, other embodiments of this invention include providing the different content elements behind a series of cascading menus or behind different tabs within the user interface screen; the menus or tabs being accessible via a set-top box remote control. In such cases the information is still aggregated within one interface but the screen real estate devoted to a particular content type is maximized by allowing different content types to take precedence at any given moment.

Within user interface screen 50, a branding window 51 is provided for content provider or service provider branding. Such branding may include channel logos, provider logos, or other graphical elements to identify the offered content with a particular provider.

In addition, a global navigation area 52 is reserved for placement of icons, widgets or other navigational tools through which a user may navigate within the user interface application. Navigation will generally be provided via a set-top box remote control, which is used to position and actuate an on-screen cursor in the conventional fashion. Typical navigation elements for such applications include those for a Home page, a Favorites page and so on.

A managed content area 53 is also provided. Within this area 53, information services relevant to the particular content category may be displayed. The particular content type may be selected through content navigation elements that are displayed in a content application navigation window 54. For example, navigation elements for content categories such as Sports, Movies, etc. may be displayed within window 54.

The On Now/Later Listing and On Demand Listing areas 55 and 56, respectively, area used for the display of the relevant program listings within the currently selected category. In some cases the On Now/later and On Demand listings will not be displayed in separate windows but will be further blended together in a single area within screen 50. Examples of such blending are described below in connection with further embodiments of the present user interface.

A scaled broadcast video window (or picture in picture (PIP) window) 57 may also be provided within screen 50. Such a window allows for display of the currently viewed programming (e.g., so that a viewer might make use of the managed content services while still watching a television program) or may be used as a preview window as a user scrolls through programming options displayed in the On Now/Later window 55 (e.g., in order to assist the viewer in making a programming selection). In some cases, previews of On Demand content could also be displayed within window 57, for example to act as an enticement for a viewer to order the program.

Finally, an advertising or promotions area 58 is reserved for the display of advertising or promotions content. Such content may or may not be related to the presently selected category at the option of the service provider. Examples of promotional content (as reflected in the samples discussed below) include advertisements for upcoming programming.

Figure 6:
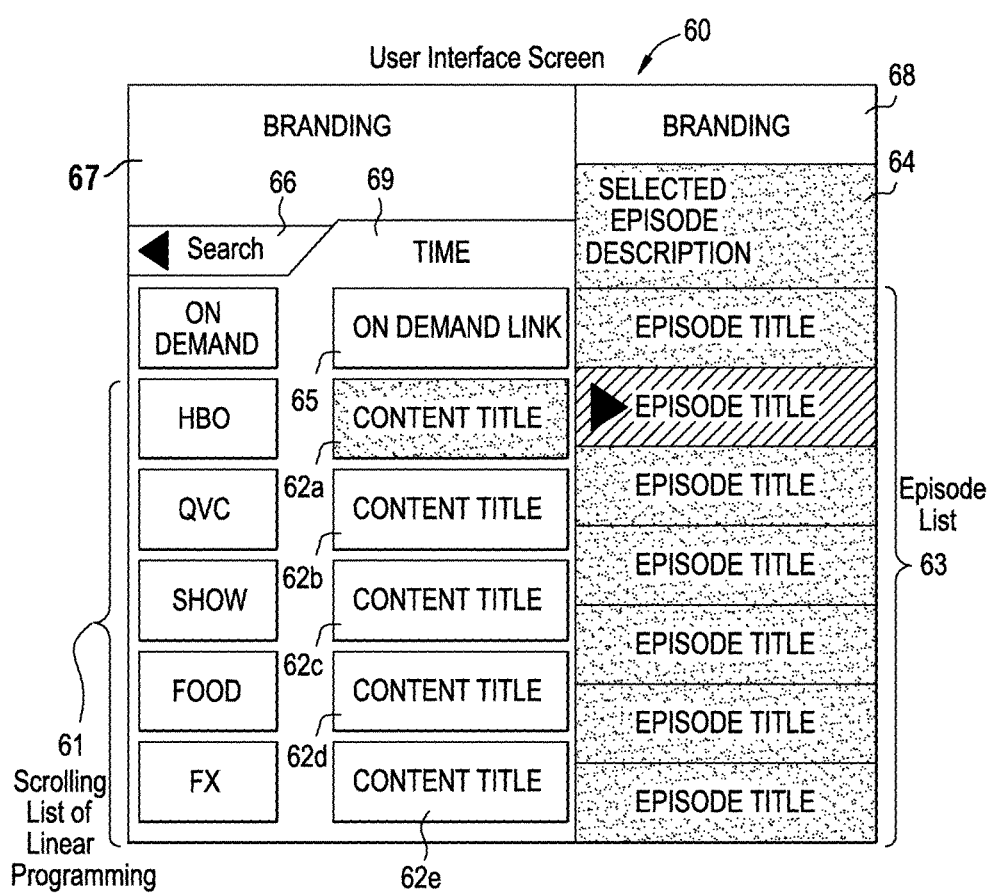
FIG. 6 illustrates an example of the use of scrolling lists of programming opportunities within a user interface configured for the presentation of multiple content types in accordance with an embodiment of the present invention.

FIG. 6 illustrates another example of a user interface screen 60 configured in accordance with an embodiment of the present invention. In this example, the left-most portion of screen 60 corresponds to the On Now/Later listings window discussed above. In particular, a scrolling (paging) vertical list 61 of linear programming opportunities (with corresponding channel information) is displayed. Upon the selection of one of the content titles 62 (which correspond to the programs available for current viewing on the associated channel) within the programming list 61, the episode list 63 at right-most side of screen 60 appears. The episode list 63 provides a complete picture of the available programming opportunities for the selected content title and includes both On Now/Later listing and On Demand listings for that title. For example, if the selected content title 62a corresponded to the HBO™ series Sopranos™, the episode list 63 at the right might display the current day's episode being broadcast (i.e., the corresponding On Now/Later listing) as well as available On Demand episodes that are offered by the content provider or are saved on the viewer's personal video recorder. The linear and non-linear listings are blended into one simple interface.

In addition to the program listings, the user interface screen 60 also includes an episode description window 64 in which information regarding the currently selected episode may be presented. In the above example, information regarding the selected Sopranos episode could be presented. Also, navigational elements such as the On Demand link 65 and Search application tab 66 are provided. On Demand link 65 provides a navigational element that allows the viewer to switch from linear listings to non-linear listings. Search application tab 66 provides a mechanism for the viewer to access a Search application. Finally, various Branding windows 67 and 68 and a Time of Day display 69 are provided.

Figure 7:
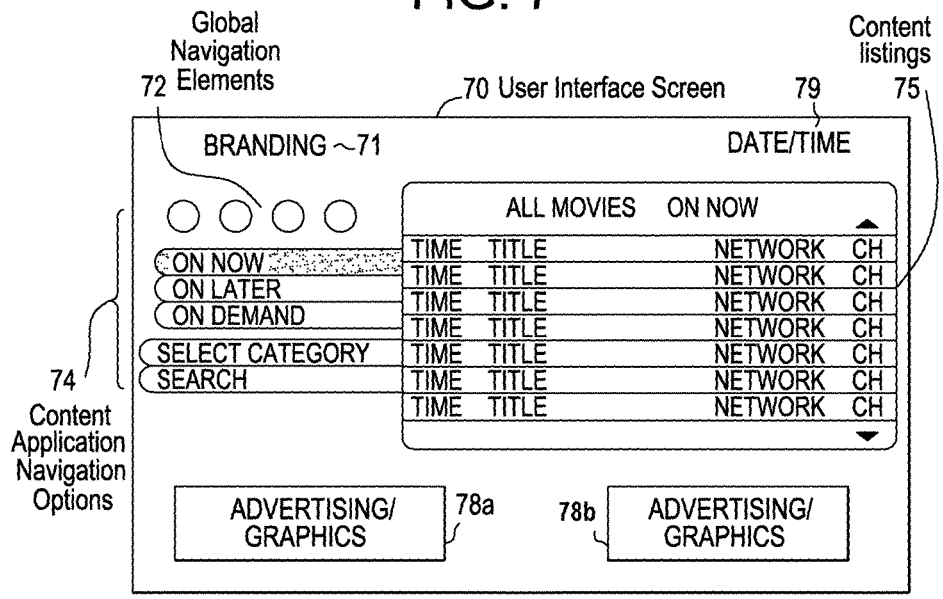
FIGS. 7, 8 and 9 illustrate the use of category applications and the selection of content elements from within such applications within a user interface configured for the presentation of multiple content types in accordance with embodiments of the present invention.
Figure 8:
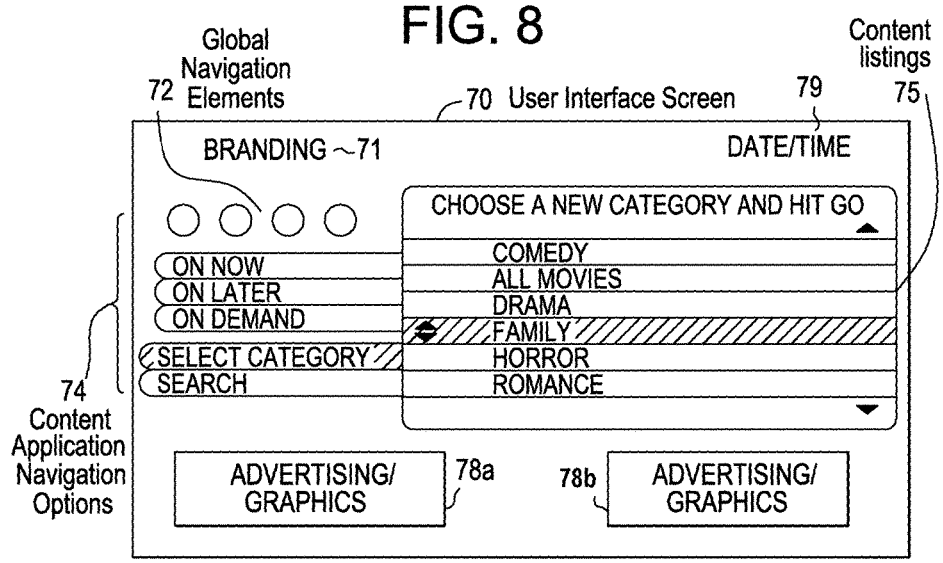
Figure 9:
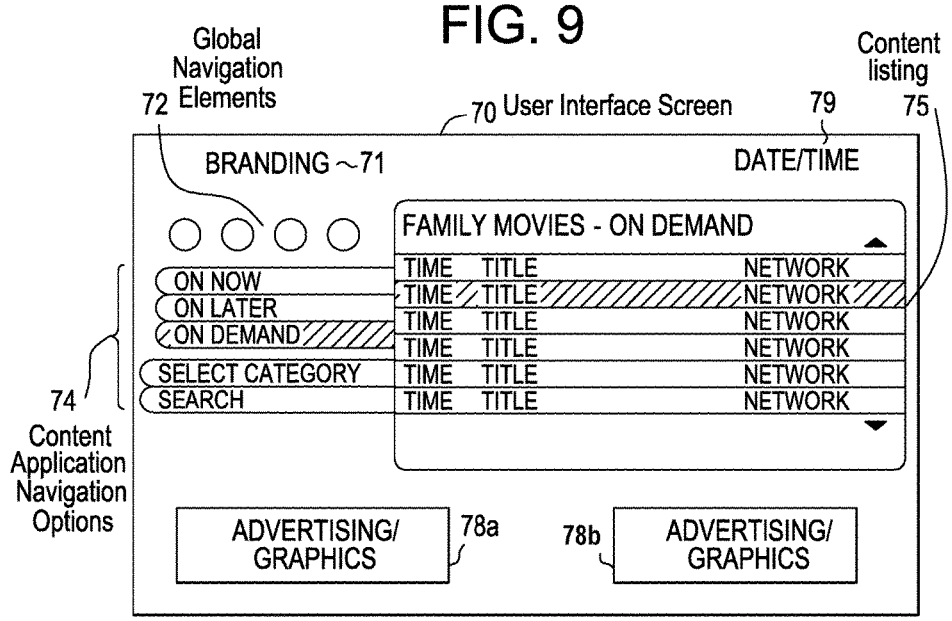

FIGS. 7, 8 and 9 illustrate an embodiment of a category application for Movies. Within this category the user can select sub-categories. The category application is displayed through a user interface screen 70 that incorporates the features of the present invention discussed above. For example, screen 70 includes a branding window 71 and a window for the display of the current date/time 79. Also included are global navigation elements (e.g., icons) 72 that allow the viewer to navigate within the user interface application.

Content category selection may be made through the content application navigation elements 74. The familiar elements for On Now, On Later and On Demand content are provided. Selection of any of these elements will result in the corresponding scrolling list of programming options being displayed within the Listings window 75. In addition, a content navigation element that allows for the selection of different category types is also present. So too are windows 78a and 78b for the display of advertising or promotional content.

The three illustrations show how a user might navigate within the interface screen 70 to select a desired program. FIG. 7 begins with the user having displayed the interface screen 70 on the television and the Movies content category application selected (e.g., through the use of appropriate remote control buttons). Presently displayed are the On Now listings for the Movies category. The listings are displayed within window 75 and may include the movie start time, title and network/channel.

Suppose now the user wishes to view only a certain subcategory of information within the Movies category. FIG. 8 shows a situation where the subscriber selected a sub-categorization of the "Movies", namely "Family Movies". This selection was made by selecting the Category navigational element from the content application navigation elements 74. In response, the listings window 75 displayed a list of available Movie subcategories, one of which is Family Using the remote control, the viewer can select this subcategory. Once the data has been subsetted in this fashion, the user may decide to shift the view of the application from "On Now" to "On Demand" FIG. 9 shows the resulting screen where listing window 75 now displays the On Demand titles available for Family Movies.

Thus, the present invention accommodates the user navigating to the "Movies" application where the user is presented with an aggregation of Movies across both linear and non-linear programming. Further, managed content such as promotions for movies or trailers which are relevant to the Family Movies category may be displayed in windows 78a and/or 78b in place of other advertising.

Figure 10:
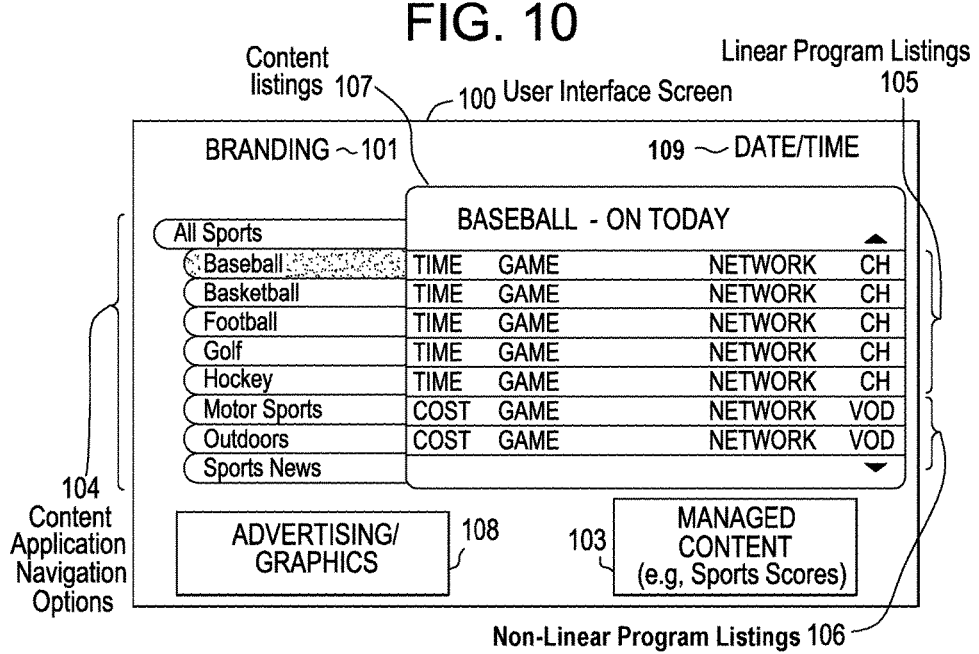
FIG. 10 illustrates another example of a user interface which combines linear and non-linear programming information in accordance with an embodiment of the present invention.

Another illustration of the present invention is one in which the linear and non-linear programming information is presented at the same time as illustrated in FIG. 10. This method allows for the combined presentation of both linear programming information and non-linear programming information without having to switch views. This method also simplifies the interface to more simply allow for selection of sub categorization.

User interface screen 100 includes the familiar branding windows 101, time/date windows 109 and content application navigation elements 104. In this example, the content category selected is "Baseball" which is a subcategory of All Sports. Thus, listings window 107 includes the baseball listings for the current date. Importantly, this listing includes both the linear program listings 105 and the non-linear program listings 106 for the selected baseball category. The linear listings may include the game time, identification and network/channel information. The non-linear baseball listings may include game identification, network and cost to view. Note that the interface also contains Managed Content section 103 in the form of tickering baseball scores that are relevant to the currently selected baseball category. Relevant advertising 108 may also be displayed.

Figure 11:
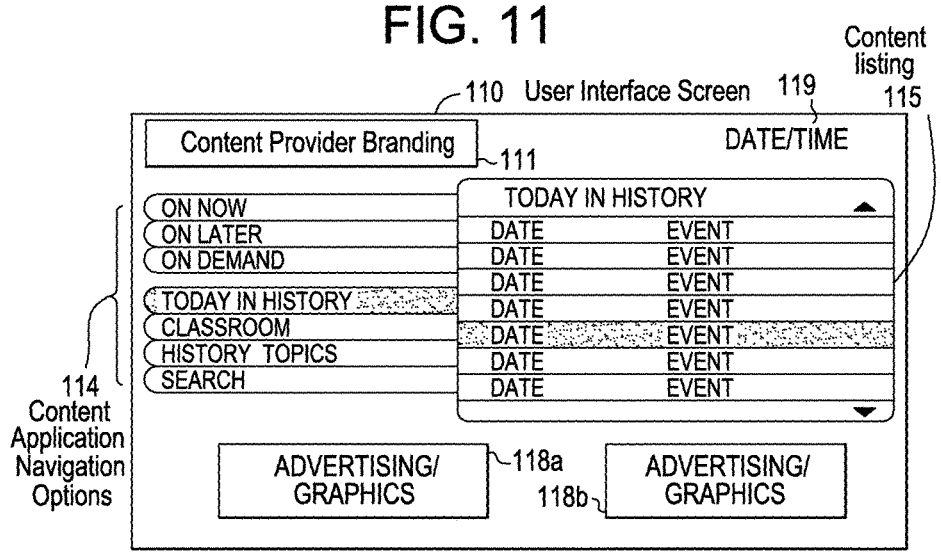
FIG. 11 illustrates an example of a user interface for a category application in accordance with an embodiment of the present invention.

FIG. 11 illustrates a demonstration embodiment of a category application for a specific content provider. Within this category the user can view linear programming information, non-linear programming information, as well as managed content information from this content provider. The illustration shows an example presentation of several Manage Content services within a user interface screen 110. One such Managed Content service is illustrated by 'Today in History", which is selected via the content application navigation elements 114. Upon selection of this element, various listings of events on the current day's date in history are displayed in listings window 115. These listings could link to text and graphic data or to on-demand videos. The interface additionally still provides the ability to navigate to linear and non-linear programming for this category. And includes the familiar branding 111, date/time 119 and advertising 118a and 118b windows.

Figure 12:
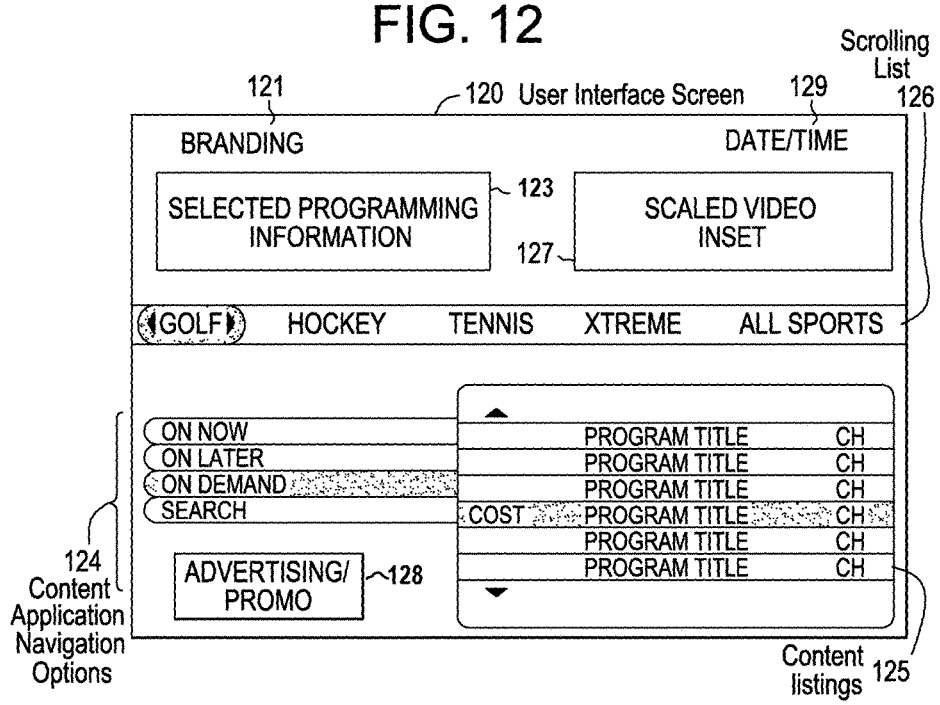
FIG. 12 illustrates another example of a user interface which combines linear and non-linear programming information for iTV category applications in accordance with an embodiment of the present invention.

FIG. 12 illustrates an embodiment of a category application for the broad category of Sports. Within this category the user can view linear programming information, non-linear programming information. This illustration further illustrates a unique way to have visibility into the sub-category filters for the Sports applications. Here the sub-categories are accessed through a horizontal scrolling list 126.

The user interface screen 120 includes the branding window 121, date/time window 129 and advertising window 128. This time, a scaled video inset window 127 is included, for example to allow the viewer to watch a picture-in-picture presentation of the currently selected programming. The content application navigation elements 124 and listings window 125 are provided for display of available content in the selected application category.

The scrolling list 126 allows for subcategory selection within the selected category. For example, within Sports, the subcategory Golf has been selected, thus causing the listings being displayed in window 125 to be related to Golf. As each listing is selected, information regarding that program may be displayed in the programming information window 123.

Figure 13:
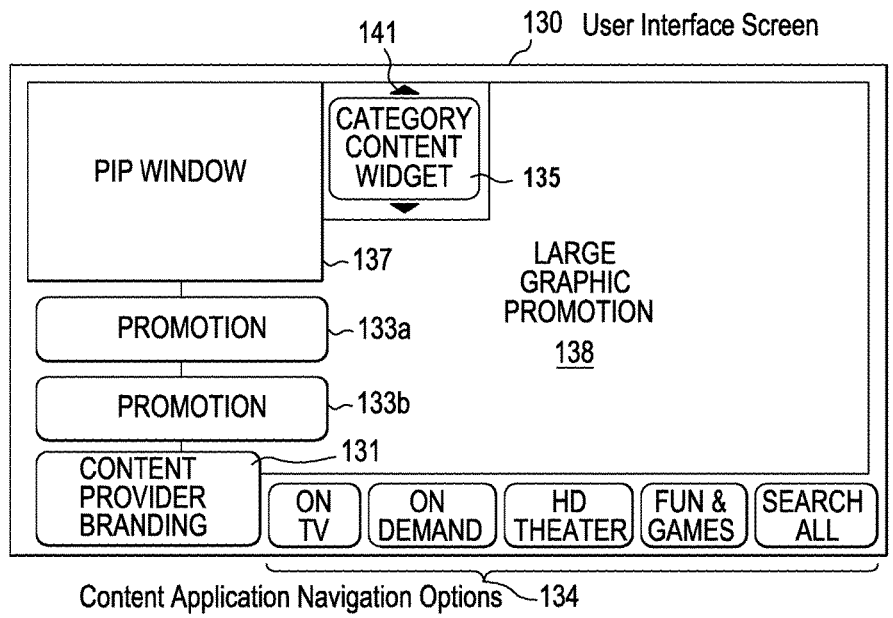
FIGS. 13 and 14 illustrate further examples of user interfaces for iTV category applications that provide access to linear and non-linear programming information through a single hierarchy in accordance with embodiments of the present invention.
Figure 14:
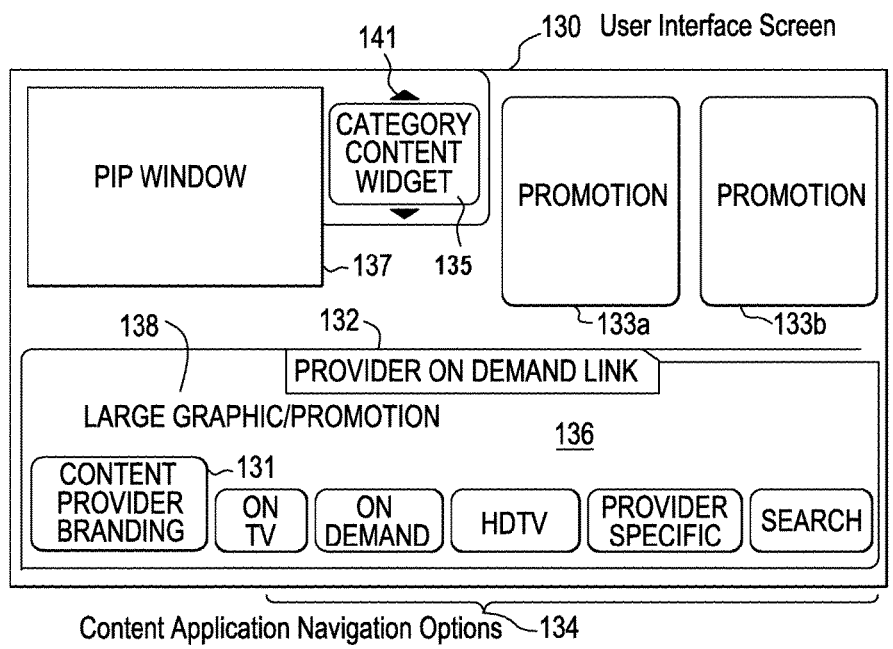

FIGS. 13 and 14 illustrate embodiments of a category application for specific content providers. From these category applications users may gain access to both linear programming information as well as non-linear programming information. Access is provided through a single category hierarchy rather than down separate paths for linear and non-linear content.

User interface screen 130 includes the branding window 131 and the familiar content application navigation elements 134 (although this time the arrangement of these elements is somewhat different than in previous examples). Managed content offered through this type of category application includes the programming promotions 133a and 133b and a large graphical promotion 138. The large graphical promotion may highlight an upcoming special presentation or high-profile series, etc. As shown in FIG. 14, the arrangement of these elements may vary to suite the content provider's needs and other links (such as global navigation links 132) may also be provided.

The examples given in FIGS. 13 and 14 also have a widget control 135 that is unique to this invention. The widget control 135 further provides category specific information filtering to allow the user to browse content relative to the given category. The widget control 135 may be illustrated by the content provider's call sign (or logo) with up and down arrows on the top and bottom of the call sign. The arrows may be replaced with other icons indicating navigation control, but regardless of the icon used the behavior of the control 135 is the same. The up and down arrows allow the user to scroll the PIP window 137 through a family of channels. The family may be all of the content provider's related channels, for example, within a service offering (e.g., all HBO channels or all Disney channels that a user has subscribed to and/or are available On Demand). In another embodiment the widget control 135 may read "Sports" (or other content category) and the up and down arrows may allow the user to scroll through the PIPs associated with all of the sports (or other content category) channels. In this way a user can view actual content instead of just listings thereof to assist in making a channel selection.

The widget control 135 includes an optional category descriptor (which category may be determined by the context of the application), up and down (or lateral or both) navigation buttons 141 (and/or mapped remote control keys) and a PIP window 137. As indicated above, the basic control behavior is to allow scrolling through a set of channels and optionally tuning to any one of the channels, while viewing the associated content in the PIP window 137 during the scrolling. The act of scrolling through the content options may also affect the other information on the screen such that stays contextual with the content displayed in the PIP window 137.

Thus, systems and methods by which subscribers are presented with navigational interfaces that blend linear, non-linear, and (in some cases) managed content or information services together in a single screen, or single iTV application have been described. Although discussed with reference to various illustrated embodiments, however, the present invention should only be measured in terms of the claims, which follow.

What is claimed is:
1. A system comprising:
one or more first computing devices; and
a second computing device;
wherein the one or more first computing devices comprise:
one or more first processors; and one or more first memories storing first executable instructions that, when executed by the one or more first processors, cause the one or more first computing devices to:
   combine data that describes two or more of linear content, non-linear content or managed content to produce, in at least two levels of a hierarchy of levels for a user interface, a blending of user-selectable content that is of the two or more of the linear content, the non-linear content or the managed content;
   send, to the second computing device, the blending of user-selectable content; and
   based on data that indicates one or more user interactions with the blending of user-selectable content, send, to the second computing device, a portion of first content that is of the two or more of the linear content, the non-linear content or the managed content; and
wherein the second computing device comprises:
   one or more second processors; and
   one or more second computer-readable media storing second executable instructions that, when executed by the one or more second processors, cause the second computing device to:
      cause display of the blending of user selectable content;
      send, to the one or more first computing devices, the data that indicates the one or more user interactions with the blending of user-selectable content; and
      cause display of the portion of the first content.

2. The system of claim 1, wherein the data that indicates the one or more user interactions with the blending of user-selectable content indicates a navigation of an on-screen cursor.

3. The system of claim 1, wherein the blending of user-selectable content comprises user-selectable linear content and user-selectable non-linear content.

4. The system of claim 3, wherein the user-selectable linear content comprises programming that is scheduled to be transmitted at particular times, and wherein the user-selectable non-linear content comprises on-demand programming.

5. The system of claim 3, wherein a first of the at least two levels comprises a combined list of content options that is of the user-selectable linear content and the user-selectable non-linear content.

6. The system of claim 1, wherein the second computing device comprises a set-top box.

7. The system of claim 1, wherein the first executable instructions, when executed by the one or more first processors cause the one or more first computing devices to send the blending of user-selectable content by broadcasting, via a network, the blending of user-selectable content.

8. A system comprising:
one or more first computing devices; and
a second computing device;
wherein the one or more first computing devices comprise:
   one or more first processors; and
   one or more first memories storing first executable instructions that, when executed by the one or more first processors, cause the one or more first computing devices to:
      send, to the second computing device, data that describes two or more of linear content, non-linear content or managed content; and
      send, to the second computing device and based on a request received from the second computing device, a portion of first content that is of the two or more of the linear content, the non-linear content or the managed content; and
wherein the second computing device comprises:
   one or more second processors; and
   one or more second computer-readable media storing second executable instructions that, when executed by the one or more second processors, cause the second computing device to:
      combine the data that describes the two or more of the linear content, the non-linear content or the managed content to produce, in at least two levels of a hierarchy of levels for a user interface, a blending of user-selectable content that is of the two or more of the linear content, the non-linear content or the managed content;
      cause display of the blending of user selectable content;
      send, to the one or more first computing devices and based on data that indicates one or more user interactions with the blending of user-selectable content, the request, wherein the request indicates the first content; and
      cause display of the portion of the first content.

9. The system of claim 8, wherein the data that indicates the one or more user interactions with the blending of user-selectable content indicates a navigation of an on-screen cursor.

10. The system of claim 8, wherein the blending of user-selectable content comprises user-selectable linear content and user-selectable non-linear content.

11. The system of claim 10, wherein the user-selectable linear content comprises programming that is scheduled to be transmitted at particular times, and wherein the user-selectable non-linear content comprises on-demand programming.

12. The system of claim 10, wherein a first of the at least two levels comprises a combined list of content options that is of the user-selectable linear content and the user-selectable non-linear content.

13. The system of claim 8, wherein the second computing device comprises a set-top box.

14. The system of claim 8, wherein the first executable instructions, when executed by the one or more first processors, cause the one or more first computing devices to transmit the data that describes the two or more of the linear content, the non-linear content or the managed content by broadcasting, via a network, the data that describes the two or more of the linear content, the non-linear content or the managed content.

15. A system comprising:
one or more first computing devices;
one or more second computing devices;
wherein the one or more first computing devices comprise:
   one or more first processors; and
   one or more first memories storing first executable instructions that, when executed by the one or more first processors, cause the one or more first computing devices to:
      combine data that describes two or more of linear content, non-linear content or managed content to produce, in at least two levels of a hierarchy of levels for a user interface, a blending of user-selectable content that is of the two or more of the linear content, the non-linear content or the managed content; and send, to the one or more second computing devices, the blending of user-selectable content; and wherein the one or more second computing devices comprise:

one or more second processors; and one or more second computer-readable media storing second executable instructions that, when executed by the one or more second processors, cause the one or more second computing devices to:

cause display of the blending of user-selectable content.

16. The system of claim 15, wherein the linear content comprises programming that is scheduled to be transmitted at particular times, and wherein the non-linear content comprises on-demand programming.

17. The system of claim 15, wherein a first of the at least two levels comprises a combined list of user-selectable content options that is of the linear content and the non-linear content.

18. The system of claim 15, wherein the first executable instructions, when executed by the one or more first processors, cause the one or more first computing devices to send the blending of user-selectable content by broadcasting, to the one or more second computing devices, the blending of user-selectable content.

19. The system of claim 15, wherein a first of the at least two levels comprises a scrolling list of content options that is of the linear content and the non-linear content.

20. The system of claim 15, wherein the one or more second computing devices comprises one or more set top boxes.

* * * * *

UNITED STATES PATENT AND TRADEMARK OFFICE
CERTIFICATE OF CORRECTION

PATENT NO. : 10,237,617 B2
APPLICATION NO. : 15/639386
DATED : March 19, 2019
INVENTOR(S) : Moreau et al.

Page 1 of 1

It is certified that error appears in the above-identified patent and that said Letters Patent is hereby corrected as shown below:

On the Title Page

Page 5, Column 2, Other Publications, Line 7:
Please delete "Actoin" and insert --Action--

Page 5, Column 2, Other Publications, Line 19:
Delete "Belingham," and insert --Bellingham,--

In the Specification

Column 2, Background, Line 5:
After "programming", insert --.--

Column 2, Background, Line 15:
After "demand", insert --.--

Column 6, Detailed Description, Line 54:
After "programming)", insert --.--

Column 10, Detailed Description, Line 3:
Delete "viewer' s" and insert --viewer's--

Column 10, Detailed Description, Line 55:
After "Family", insert --.--

Column 10, Detailed Description, Line 58:
After "Demand"", insert --.--

Column 11, Detailed Description, Lines 32-33:
Delete ""Today in History","" and insert --"Today in History",--

Signed and Sealed this
Fifteenth Day of October, 2019

Andrei Iancu
*Director of the United States Patent and Trademark Office*